INVENTOR

Bernhard Kunst

BY Stephens, Huettig and O'Connell
ATTORNEY

INVENTOR

Bernhard Kunst

BY Stephens, Huettig and O'Connell
ATTORNEYS

United States Patent Office 3,649,471
Patented Mar. 14, 1972

3,649,471
VERTICAL MULTISTAGE FLASH EVAPORATION AND DIRECT CONTACT CONDENSATION
Bernhard Kunst, Gustavsburg, Germany, assignor to GHH-M.A.N. Technik Gesellschaft für Anlagenbau m.b.H., Essen (Ruhr), Germany
Continuation-in-part of application Ser. No. 640,246, May 22, 1967. This application July 11, 1968, Ser. No. 744,138
Claims priority, application Germany, May 27, 1966, M 69,650
Int. Cl. B01d *3/06, 5/00*
U.S. Cl. 203—11                         2 Claims

ABSTRACT OF THE DISCLOSURE

In a method for concentrating liquid solutions and producing the solvent in which the multistage flash evaporation and direct contact condensation are combined with hydrostatic compensation both on the solvent and solution sides of the pressure differences between consecutive stages, the liquid depths in the evaporation and condensation chambers of all stages are kept approximately at the same low level by compensating for the hydrodynamic head losses by means of the lifting effect produced by solution stage vapor.

---

This application is a continuation-in-part of my now abandoned copending application S.N. 640,246, filed May 22, 1967, for "Multiple Effect Fash Evaporation and Contact Condensation."

This invention is an improvement in the method disclosed in my copending application S.N. 708,724, filed Feb. 27, 1968, for "Method for Multiple Effect Flash Evaporation and Contact Condensation," now U.S. Letter Patent No. 3,457,143, which is a streamline continuation application of my earlier application S.N. 455,403, filed May 13, 1965, and now abandoned.

Flash evaporators are used for concentrating solutions as well as for producing the solvent. The solution is first heated to a pressure high enough to avoid boiling and then cooled while being flashed by successive decreases in pressure. When flash evaporation is used with direct condensation, the vapor does not condense on a solid coolng surface but on a current of cold solvent which thereby becomes heated.

The solvent and solution are usually conducted in countercurrent flow through several stages in which each is composed of a flashing chamber and a condensation chamber. Since the solution flows in the direction of decreasing temperatures, the solvent must be pumped stagewise against the increasing vapor pressures as disclosed in the patent to Othmer, No. 3,288,686, if no hydrostatical pressure compensation is provided for. This occurs if the stages are located at the geodetical levels which result from expressing the stage vapor pressures in liquid column heights. In this method, the solution flows upwardly and the solvent downwardly. Equilibrium can only be achieved, during operation, if a driving force is added to the system to compensate for head losses. These losses can be of two types, namely, hydrostatical losses and hydrodynamical losses.

Hydrostatical losses occur if the solvent or solution at any point of their passage through a stage loses static head while falling down a certain height. Hydrodynamical losses result from throttling, wall friction and flow deflection.

The driving force used for overcoming these losses can be, for example, the vapor flashed off in the solution as it rises through the ducts connecting two consecutive stages. Thus a natural lifting effect is obtained which is sufficient to compensate for a certain amount of head losses, especially in the temperature range above 80° C. approximately applying to aqueous solutions. It is known to use this driving force in combination with a flow pattern during transition through the stages where both hydrostatical and hydrodynamical head losses arise as disclosed in Lockman, Pat. No. 3,249,517. My aforesaid application describes a method where the hydrostatical head losses are avoided and where these are compensated for not only by the natural lifting effect of the vapor flashed off in the solution, but also by decreasing liquid depth from stage to stage in the direction of flow and in which the solution passes successively through several arranged one above another. Thus due to the connection of the different stages by uninterrupted liquid volumes both in the evaporation and condensation side the different vapor pressures in all stages starting in the upper most and coldest stage down to the lowermost and hottest stage and equalized by the static pressure of both liquids which increases from top to bottom. The small losses occurring during the transition from one stage to the next are equalized to the liquid depths decreasing in the direction of flow.

An inherent disadvantage of this method in the allowable number of stages is restricted by the height of the uppermost and lowermost chambers because the initial liquid depths when fed into the evaporator must obviously be higher the more the hydrodynamical losses are expected during the liquid flow through the stages. This disadvantage is of increasing importance with lower stage temperatures because the saturation pressure increment decreases with dropping temperature.

The object of this invention is to improve upon the method in my aforesaid application by introducing solution stage vapor into the solution shaft to avoid the aforesaid disadvantage.

The means by which the objects of this invention are obtained are described more fully with reference to the accompanying drawings, in which.

Figure 1:
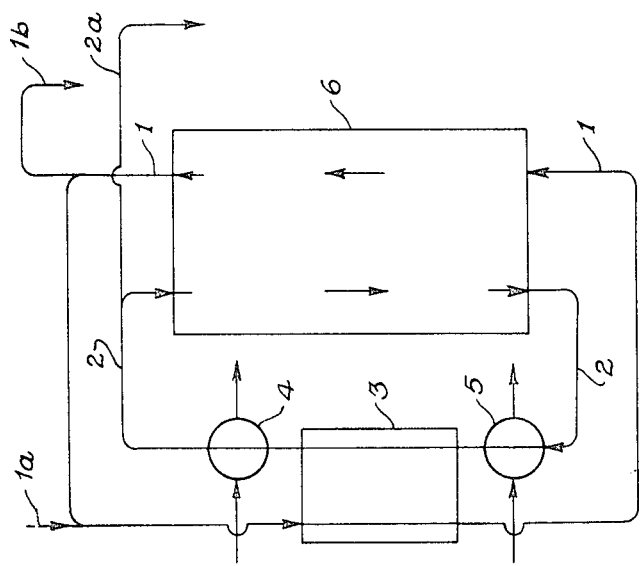
FIG. 1 is a schematic flow diagram of the prior art evaporation method using direct contact condensation.

FIG. 1 is a schematic flow sheet of a conventional flash evaporator with direct contact condensation. The solution line 1 goes through a closed circuit in counterflow with the solvent line 2. Solution line 1 goes through a closed circuit including a heating step in the heat exchanger 3 which is preferably a liquid-liquid heat exchanger and a cooling step of multistage flash in the evaporator 6. The solution is fed into the circuit at inlet 1*a* and the concentrate leaves it at the exit 1*b*. The solvent 2 flowing countercurrent to the solution is heated in the evaporator 6 by direct condensation, reaches its maximum temperature after flowing through the heater 5, releases most of its heat content to the solution in heat exchanger 3, cools down to its minimum temperature in cooler 4, and re-enters evaporator 6. Part of the solvent is extracted through line 2*a* in order to keep the concentration in the circuit at a constant level.

Figure 3:
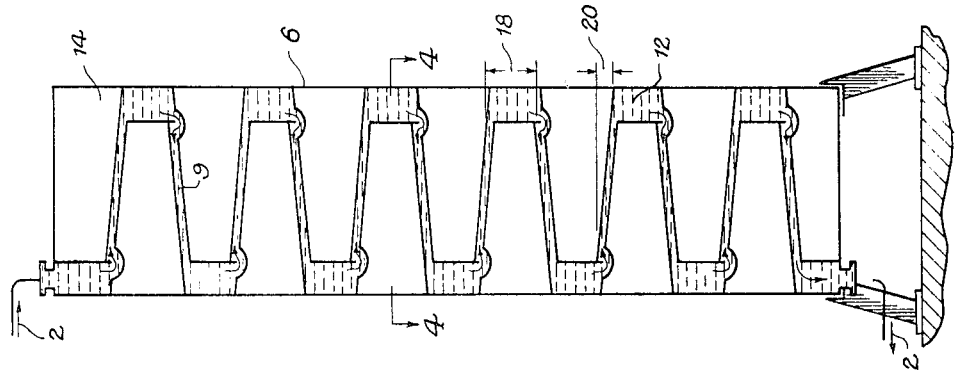
FIG. 3 is a similar view taken on the line 3—3 of FIG. 4.
Figure 2:
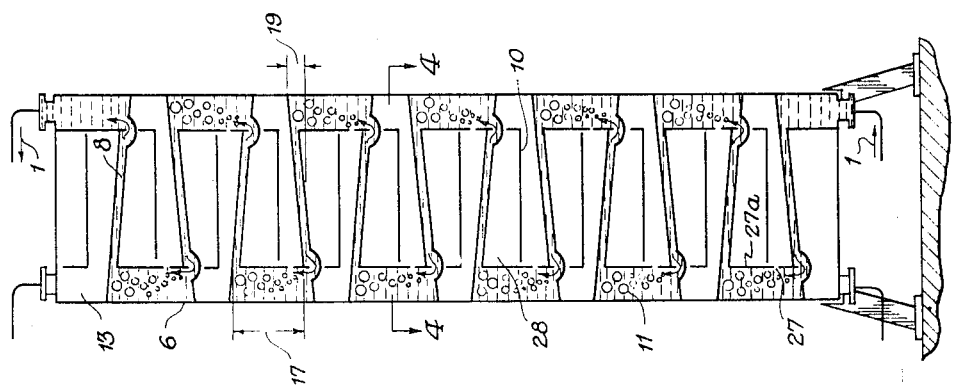
FIG. 2 is a schematic view of a cross-section through the evaporator of this invention as taken on line 2—2 of FIG. 4.
Figure 4:
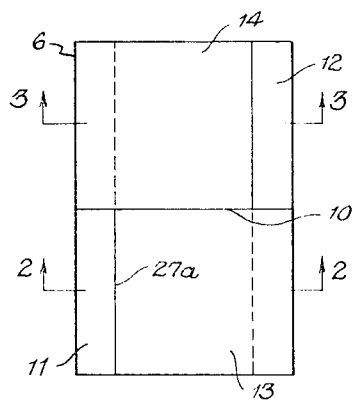
FIG. 4 is a cross-sectional view taken on the line 4—4 of FIG. 3.

FIGS. 2, 3 and 4 show the evaporator 6 in accordance with this invention. It is principally composed of a certain number of stages, which, in turn, comprise chambers 13 for flash evaporation and juxtaposed chambers 14 for direct contact condensation, as shown in FIG. 4. Both chambers 13 and 14 are enclosed in a common housing. The bottoms 8 and 9 of the chambers are preferably formed as simple plates which are slightly downwardly inclined in the direction of the flow of the liquids in order to ensure the constant liquid depth. Walls 10 separate the liquids flowing through the chambers and the spaces 28 allow the solution stage vapors to be carried from the flash evaporation side to the direct condensation side. The height 18 in a solvent shaft 12 is, when expressed in liquid column height, approximately equal to the pressure difference between two consecutive stages minus head losses due to flow friction and deflection. The solution shaft 11 must have a height 17 equal to the height 18 of the shaft 12 increased by the pitches 19 and 20 of the bottoms 8 and 9, if both bottoms are composed of simple plates. If substantially equal densities for the solvent and solution are assumed, under equilibrium conditions, the solution would rise only to a height corresponding to the pressure difference of the stages. The missing height, expressed in liquid column height, is just the hydrodynamic head loss for moving the solvent and solution through the stage, wherein the head for overcoming the pitches 19 and 20 will be considered as hydrodynamic losses, since the bottom inclination only serves for compensating the friction between the liquid and the bottom.

To overcome these losses in an improved manner as compared to my aforesaid application, a certain number of holes 27 are provided through the lower end of the wall 27a between shaft 11 and adjacent flash chamber 13. Thus solution stage vapor flows into the liquid volume contained in shaft 11 because of the slight superpressure of the liquid in chamber 13 as against the pressure of the liquid. Consequently, the mean density of the liquid situated above the holes decreases and thus the shaft 11 acts as a vapor lift. Since the available vapor quantity in chamber 13 is large, the lifting effect is high enough to overcome the aforesaid hydrodynamic losses including the pitch heights 19 and 20. An additional advantage of this method is that the stage vapor flowing through the holes 27 activates flashing of the solution and thus a more complete evaporation is obtained.

Figure 5:
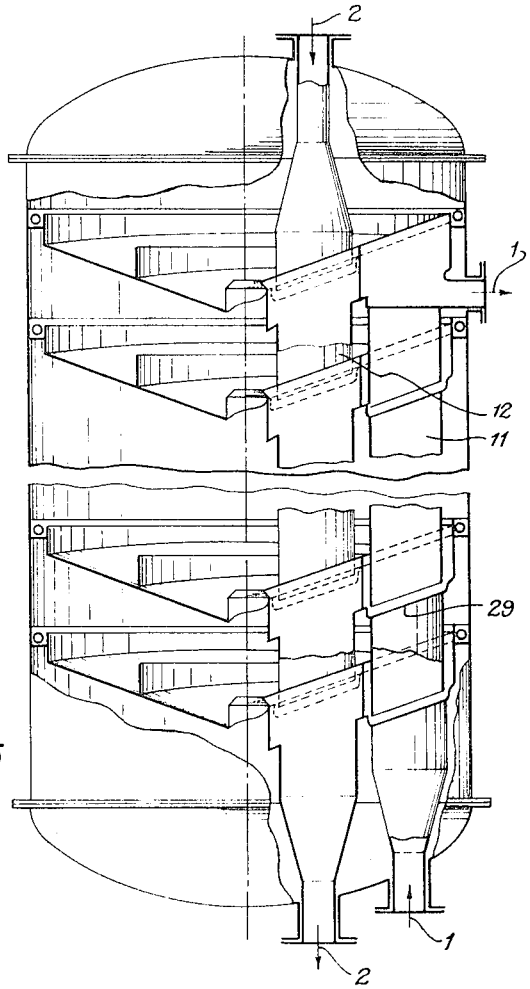
FIG. 5 is a vertical cross-sectional view of an evaporator constructed according to this invention.
Figure 6:
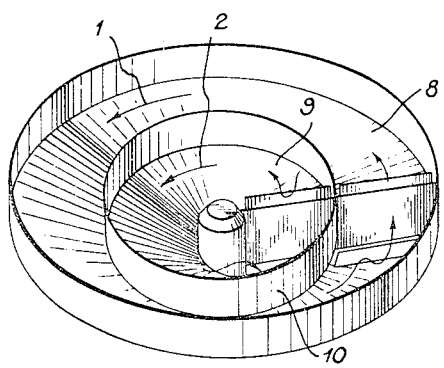
FIG. 6 is a perspective view of one of the stages in the evaporator of FIG. 5.

FIG. 5 shows in vertical cross-section a practical form of an apparatus for performing this invention in accordane with the method described with reference to FIGS. 2, 3 and 4. As shown in FIG. 6, each stage is constructed as a circular sheet or a tray having concentric bottoms 8 and 9 for carrying the solution and the solvent, respectively. The bottom 8 for the solution surrounds the bottom 9 for the solvent with the bottoms being separated by a concentric wall 10. The circular tray is formed with a slightly downward inclination in the direction of the liquid flow as well as toward the center of the tray. The first-mentioned inclination is for compensating for the friction between the liquid and the bottom and the second for equalizing the centrifugal force.

Shafts 11 and 12 for the solution flow line 1 and solvent flow line 2 have their own enclosing walls and at their upper ends are rigidly connected to the tray. Their lower ends project into troughs 29 in the tray in order to prevent the interruption of the liquid columns.

Above all, the advantages of this construction lie in the utilization of one type of tray for all stages. The trays can therefore be mass-produced from sheet metal or synthetic material either by pressing or casting. A further advantage is that a tubular shape can be used as the housing which can also be made of metal or synthetic material.

Having now described the means by which the objects of this invention are obtained,

I claim:

1. In the method for multistage flash evaporation of a solution and counterflow direct contact condensation of the solvent vapor in condensate in order to concentrate the solution and to recover the solvent wherein the solution successively passes through several stages arranged in a tank above one another and provided with juxtaposed evaporation and condensation chambers, with said solution ascending in the evaporation stages beginning with the first and lowermost stage and said solvent descending in said condensation chambers in reverse order, and in which the solution is heated to a temperature just a little below its boiling point, thereafter the heated solution is introduced into the first stage evaporation chamber and partially flash evaporated therein, the vaporized portion of said solution is then introduced into the first stage condensation chamber which is vapor-connected only to the first stage evaporation chamber and located on the same level in the tank, the vaporized portion is then condensed in said first stage condensation chamber by direct contact with the condensate proceeding from high located stages, the portion of the solution that has not been vaporized in the first stage is introduced into the second stage evaporation chamber lying on a higher level at a lower pressure, the resulting vapor which is created thereby is introduced into the second stage condensation chamber which is vapor-connected only to the second evaporation chamber and located on the same level in the tank but which is liquid connected to the first stage condensation chamber and the condensate therein, and with said different stages being connected by two continuous and uninterrupted separate liquid columns for both, one each on the evaporation and the condensation sides, whereby the different vapor pressures in the stages starting with the uppermost and coldest stage down to the lowermost and hottest stage are balanced solely by the static pressures of the respective liquids which pressures increase on the way from top to bottom, and the small dynamic losses arising from flow frictions and deflections during the transition from one stage to the next are compensated for solely and uniquely by the differences of the liquid depths which decrease stage by stage in the contrary flow directions of the solution and of the solvent streams, the improvement comprising admixing a proportion of the vapors forming in the evaporation chamber with the solution in the interconnecting passages to compensate for flow and head losses occurring on the interface plates and in the connecting passages, said vapors flowing due to their natural over-pressure through a small orifice provided above the liquid level in the chamber into said connecting passages thereby creating appropriate buoyancy to assist upward flow.

2. A method as in claim 1, in which the depths of the flowing liquid are maintained uniformly shallow by sloping the interface plates at a suitable angle and by proportioning the flows in all stages on both the evaporating and condensing sides.

References Cited

UNITED STATES PATENTS

| 643,794 | 2/1900 | Harvey | 139—18 |
|---|---|---|---|
| 1,524,184 | 1/1925 | Lawrence | 159—18 |
| 3,232,847 | 2/1960 | Hoff | 202—173 |
| 3,249,517 | 5/1966 | Lockman | 159—18 |
| 3,298,932 | 1/1967 | Bauer | 202—174 |
| 3,312,601 | 4/1967 | Wilson et al. | 203—11 |
| 3,337,419 | 8/1967 | Kogan | 203—11 |
| 3,444,049 | 5/1969 | Starmer | 202—173 |
| 3,446,712 | 5/1969 | Othmer | 202—173 |
| 3,457,143 | 7/1969 | Kunst | 202—173 |
| 3,499,827 | 3/1970 | Cox | 202—173 |
| 3,503,853 | 3/1970 | Taubert et al. | 202—173 |
| 3,515,645 | 6/1970 | Wetch | 202—173 |

WILBUR L. BASCOMB, Jr., Primary Examiner

U.S. Cl. X.R.

159—18; 202—173, 185 A, 187; 203—88